(12) United States Patent
Kodera

(10) Patent No.: US 11,794,806 B2
(45) Date of Patent: Oct. 24, 2023

(54) CONTROL APPARATUS FOR STEERING SYSTEM

(71) Applicant: JTEKT CORPORATION, Osaka (JP)

(72) Inventor: Takashi Kodera, Kazaki (JP)

(73) Assignee: JTEKT CORPORATION, Kariya (JP)

( * ) Notice: Subject to any disclaimer, the term of this patent is extended or adjusted under 35 U.S.C. 154(b) by 134 days.

(21) Appl. No.: 17/156,713

(22) Filed: Jan. 25, 2021

(65) Prior Publication Data

US 2021/0229739 A1 Jul. 29, 2021

(30) Foreign Application Priority Data

Jan. 28, 2020 (JP) ................................ 2020-011735

(51) Int. Cl.
| | | |
|---|---|---|
| *B62D 5/04* | (2006.01) | |
| *B62D 3/12* | (2006.01) | |
| *B62D 6/10* | (2006.01) | |
| *B62D 6/00* | (2006.01) | |
| *B62D 5/00* | (2006.01) | |

(52) U.S. Cl.
CPC ............. *B62D 6/008* (2013.01); *B62D 5/006* (2013.01); *B62D 5/0496* (2013.01)

(58) Field of Classification Search
None
See application file for complete search history.

(56) References Cited

U.S. PATENT DOCUMENTS 10,435,065 B2 * 10/2019 Kim .......................... B62D 6/00
2008/0306655 A1 12/2008 Ukai et al.
2009/0000857 A1 * 1/2009 Sugiyama ............ B62D 5/0463
180/444
2009/0099731 A1 4/2009 Watanabe et al.
2017/0137056 A1 5/2017 Aoki et al.
2017/0203786 A1 7/2017 Min
(Continued)

FOREIGN PATENT DOCUMENTS

EP 3 756 976 A1 12/2020
JP 2009-096265 A 5/2009
(Continued)

OTHER PUBLICATIONS

Aug. 3, 2021 extended Search Report issued in European Patent Application No. 21153450.8.

*Primary Examiner* — Adam D Tissot
*Assistant Examiner* — Laura E Linhardt
(74) *Attorney, Agent, or Firm* — Oliff PLC

(57) ABSTRACT

A control apparatus for a steering system includes control circuitry configured to perform an angle control process for controlling, to an angle command value, a convertible angle that is convertible into a rotational angle of the electric motor, a predetermined component calculation process for calculating a predetermined component containing at least one of two components that are a viscosity component and a friction component of the steering system, while using a value of a variable regarding a control quantity of the electric motor as an input, and a relationship change process for changing a relationship of an output from a control unit for the steering system to an input to the control unit, based on the predetermined component calculated through the predetermined component calculation process.

9 Claims, 8 Drawing Sheets

(56) References Cited

U.S. PATENT DOCUMENTS

| | | | |
|---|---|---|---|
| 2018/0178832 | A1 | 6/2018 | Minaki et al. |
| 2018/0265121 | A1 | 9/2018 | Kim |
| 2018/0339725 | A1 | 11/2018 | Kodera et al. |
| 2019/0233004 | A1 | 8/2019 | Kodera |
| 2019/0367075 | A1 | 12/2019 | Kodera |
| 2019/0367079 | A1 | 12/2019 | Kodera |
| 2020/0324812 | A1 | 10/2020 | Matsuo et al. |
| 2022/0242479 | A1* | 8/2022 | Hong ................. B62D 6/10 |

FOREIGN PATENT DOCUMENTS

| | | | |
|---|---|---|---|
| JP | 2017-095076 A | 6/2017 | |
| WO | 2019/087864 A1 | 5/2019 | |
| WO | WO-2020246787 A1 * | 12/2020 | ............ B60W 10/20 |

* cited by examiner

CONTROL APPARATUS FOR STEERING SYSTEM

CROSS-REFERENCE TO RELATED APPLICATION

This application claims priority to Japanese Patent Application No. 2020-011735 filed on Jan. 28, 2020, incorporated herein by reference in its entirety.

BACKGROUND

1. Technical Field

The disclosure relates to a control apparatus for a steering system, namely, a control apparatus configured to control a steering system that turns turning wheels of a vehicle and that includes an electric motor.

2. Description of Related Art

For example, Japanese Unexamined Patent Application Publication No. 2009-96265 (JP 2009-96265 A) describes a control apparatus that makes the gain of an assist torque variable based on a torque transmitted from turning wheels.

SUMMARY

The frequency response characteristics of the force with respect to the displacement of a steering system generally have a viscosity such that the gain increases in a specific frequency range. Therefore, the controllability in controlling the rotational angle equivalent to the displacement of the steering system by the torque of an electric motor of the steering system differs depending on whether the intensity of a component in the specific frequency range is high or low. It should be noted herein that the viscosity component of the steering system may differ in magnitude depending on the individual difference, aging, and temperature of the steering system. It is therefore difficult to adapt a control unit for the steering system in advance optimally for the viscosity component of the steering system.

The frequency component of the steering system as well as the viscosity component of the steering system may differ in magnitude depending on the individual difference, aging, and temperature. It is therefore difficult to adapt the control unit for the steering system in advance optimally for the viscosity component of the steering system.

1. An aspect of the disclosure relates to a control apparatus for a steering system. The steering system is configured to turn turning wheels of a vehicle, and includes an electric motor. The control apparatus is configured to control the steering system. The control apparatus includes control circuitry configured to perform an angle control process for controlling, to an angle command value, a convertible angle that is convertible into a rotational angle of the electric motor, a predetermined component calculation process for calculating a predetermined component containing at least one of two components that are a viscosity component and a friction component of the steering system, while using a value of a variable regarding a control quantity of the electric motor as an input, and a relationship change process for changing a relationship of an output from a control unit for the steering system to an input to the control unit, based on the predetermined component calculated through the predetermined component calculation process.

In the foregoing configuration, in consideration of the fact that the predetermined component influences the control of the electric motor, the predetermined component is calculated while using the value of the variable regarding the control quantity of the electric motor as the input. By then changing the relationship between the input and the output of the control unit for the steering system based on the predetermined component, it becomes possible to compensate for an inconvenience resulting from the difference in controllability of the steering system between a case where the predetermined component is large and a case where the predetermined component is small.

2. The predetermined component calculation process may include a viscosity component calculation process for calculating the viscosity component as the predetermined component, and the relationship change process may include a process for changing the relationship of the output from the control unit for the steering system to the input to the control unit, based on the viscosity component calculated through the viscosity component calculation process.

In the foregoing configuration, in consideration of the fact that the viscosity component influences the control of the electric motor, the viscosity component is calculated while using the value of the variable regarding the control quantity of the electric motor as the input. By then changing the relationship between the input and the output of the control unit for the steering system based on the viscosity component, it becomes possible to compensate for an inconvenience resulting from the difference in controllability of the steering system between a case where the viscosity component is large and a case where the viscosity component is small.

3. The viscosity component calculation process may include a disturbance torque calculation process for calculating, as a disturbance torque, a torque component influencing the convertible angle other than a torque of the electric motor, while using a value of a variable regarding the torque of the electric motor, a detection value of the convertible angle, and the angle command value as values of variables regarding the control quantity.

In the foregoing configuration, in consideration of the fact that the torque component influencing the convertible angle other than the torque of the electric motor includes the viscosity component, the viscosity component can be calculated through the use of the disturbance torque calculation process.

4. The viscosity component calculation process may include a filtering process for allowing selective transmission of a specific frequency component of the disturbance torque, while using the disturbance torque as an input, and the viscosity component calculation process may use an output of the filtering process as the viscosity component.

In the foregoing configuration, in consideration of the fact that the viscosity component is noticeable at a given frequency, the viscosity component can be accurately calculated when the specific frequency component is a frequency at which the viscosity component is particularly large, by using the output of the filtering process as the viscosity component.

5. The filtering process may include an intensity change process for changing an intensity of the output in accordance with a temperature of the steering system, even when the input to the filtering process remains unchanged.

The intensity of the viscosity component changes in accordance with the temperature of the steering system. Therefore, even when the intensity change process is not performed as in the foregoing configuration, the intensity of the output of the filtering process differs depending on the temperature of the steering system. It should be noted herein that the intensity of the output of the filtering process is daringly changed in accordance with the temperature of the steering system in the foregoing configuration. Thus, the degree of freedom in changing the relationship through the relationship change process based on the output of the filtering process is more easily enhanced than in the case where the intensity change process is not used.

6. The convertible angle may be an angle that is convertible into a turning angle of the turning wheels. In the foregoing configuration, the viscosity to be calculated through the viscosity component calculation process means the viscosity regarding the frequency response characteristics between the turning angle and the torque of the electric motor configured to turn the turning wheels. Accordingly, in the foregoing configuration, it is possible to compensate for the influence on the controllability of the steering system resulting from the influence of the viscosity on the controllability of the turning angle.

7. The control unit may be a control unit configured to control the convertible angle to the angle command value. In the foregoing configuration, the controllability of the turning angle can be appropriately restrained from decreasing due to viscosity, by changing the relationship between the input and the output of the control unit for the turning angle through the relationship change process.

8. The steering system may include a steering wheel that is displaceable without transmitting power to the turning wheels. In the foregoing configuration, the steering wheel can be displaced without transmitting power to the turning wheels, and thus, a decrease in controllability of the turning angle due to viscosity may not be transmitted to the steering wheel. In this case, a driver may feel uncomfortable, for example, may feel that consistency between the operation of the steering wheel and the turning of the turning wheels decreases. As a measure against this, in the foregoing configuration, the consistency can be restrained from decreasing, by compensating for a decrease in controllability of the turning angle due to viscosity, through the relationship change process.

9. The steering system may include a steering wheel that is displaceable without transmitting power to the turning wheels. The electric motor may be a turning-side electric motor. The steering system may include a steering-side electric motor configured to apply a torque against displacement of the steering wheel. The control unit may be a control unit configured to control the torque of the steering-side electric motor.

In the foregoing configuration, the steering wheel can be displaced without transmitting power to the turning wheels, and thus, a decrease in controllability of the turning angle due to viscosity may not be transmitted to the steering wheel. In this case, the driver may feel uncomfortable, for example, may feel that consistency between the operation of the steering wheel and the turning of the turning wheels decreases. As a measure against this, in the foregoing configuration, a torque against displacement of the steering wheel can be applied so as to restrain the consistency from decreasing, by changing the relationship between the input and the output of the control unit configured to control the torque of the steering-side electric motor, through the relationship change process.

10. The steering system may include steering wheel that is displaceable without transmitting power to the turning wheels. The electric motor may be a steering-side electric motor configured to apply a torque against displacement of the steering wheel.

In the foregoing configuration, the viscosity to be calculated through the viscosity component calculation process means the viscosity regarding the frequency response characteristics between the torque of the steering-side electric motor configured to rotationally displace the steering wheel and the steering angle that is the rotational angle of the steering wheel. On the other hand, in the foregoing configuration, the steering wheel can be displaced without transmitting power to the turning wheels, and thus, a decrease in controllability of the steering angle due to viscosity may not be transmitted to the turning wheels. In this case, the driver may feel uncomfortable, for example, may feel that consistency between the operation of the steering wheel and the turning of the turning wheels decreases. As a measure against this, in the foregoing configuration, the consistency between the operation of the steering wheel and the turning of the turning wheels can be restrained from decreasing, through the relationship change process.

11. The control unit may be a control unit configured to control a torque of the steering-side electric motor. In the foregoing configuration, the torque that is generated by the steering-side electric motor to act against the operation of the steering wheel can be restrained from deviating from an appropriate value due to viscosity, by changing the relationship between the input and the output of the control unit configured to control the torque of the steering-side electric motor, through the relationship change process.

12. The steering system may include a turning-side electric motor that is an electric motor configured to turn the turning wheels, and the control unit may be a control unit configured to control a torque of the turning-side electric motor.

In the foregoing configuration, the consistency between the operation of the steering wheel and the turning of the turning wheels can be restrained from decreasing, by changing the relationship between the input and the output of the control unit configured to control the torque of the turning-side electric motor, through the relationship change process.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

The first embodiment regarding a control apparatus for a steering system will be described hereinafter with reference to the drawings.

Figure 1:
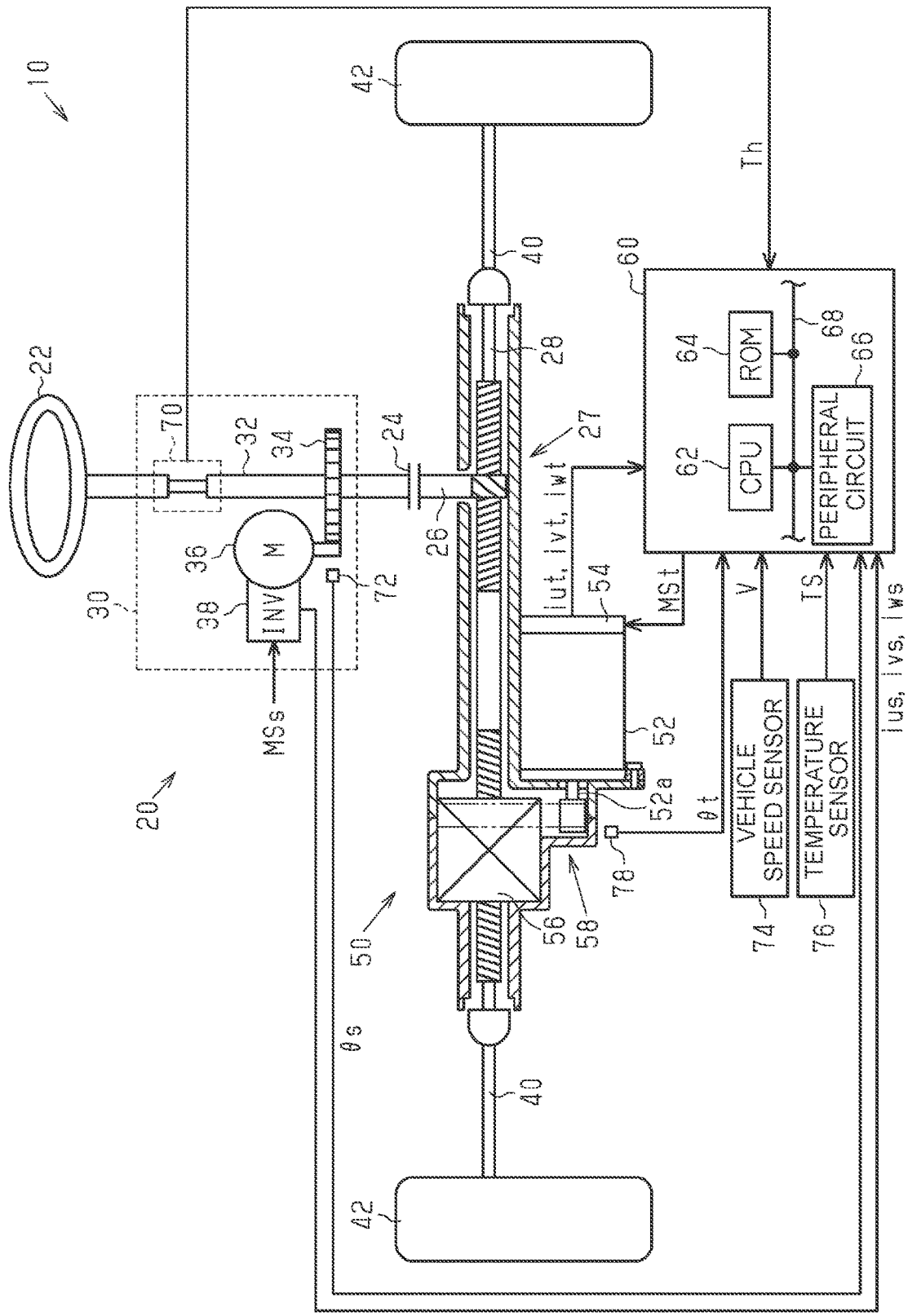
FIG. 1 is a view showing a control apparatus and a steering system according to a first embodiment.

As shown in FIG. 1, a steering system 10 includes a steering mechanism 20, a turning actuator 50 that turns turning wheels 42, and the turning wheels 42. The steering mechanism 20 includes a steering wheel 22, a drag actuator 30 that applies a drag that is a force against the operation of the steering wheel 22 performed by a driver, a rack-and-pinion mechanism 27, and a clutch 24 that is interposed between an input shaft 32 rotating integrally with the steering wheel 22 and the rack-and-pinion mechanism 27.

The drag actuator 30 includes the input shaft 32, a decelerator 34, a steering-side electric motor 36, and an inverter 38, and applies the power of the steering-side electric motor 36 to the input shaft 32 via the decelerator 34. In the present embodiment, a three-phase surface magnet synchronous electric motor (SPMSM) is used as an example of the steering-side electric motor 36. The rack-and-pinion mechanism 27 includes a pinion shaft 26 that is mechanically coupled to the input shaft 32 via the clutch 24, and a rack shaft 28, and converts the rotational power of the pinion shaft 26 into axial displacement of the rack shaft 28. The clutch 24 is engaged to transmit the power of the input shaft 32 to the pinion shaft 26, and is released to shut off the transmission of power between the input shaft 32 and the pinion shaft 26. When the clutch 24 is engaged, the rotational power of the steering wheel 22 is converted into axial displacement of the rack shaft 28. This axial displacement is transmitted to the turning wheels 42 via tie rods 40 coupled to both ends of the rack shaft 28, respectively. Thus, the turning angle of the turning wheels 42 changes.

On the other hand, the turning actuator 50 shares the rack shaft 28 with the steering mechanism 20, and includes a turning-side electric motor 52, an inverter 54, a ball screw mechanism 56, and a belt-type deceleration mechanism 58. The turning-side electric motor 52 is a source for generating power for turning the turning wheels 42. In the present embodiment, a three-phase surface magnet synchronous electric motor (SPMSM) is used as an example of the turning-side electric motor 52. The ball screw mechanism 56 is integrally attached to the periphery of the rack shaft 28, and the belt-type deceleration mechanism 58 transmits the rotational force of an output shaft 52a of the turning-side electric motor 52 to the ball screw mechanism 56. The rotational force of the output shaft 52a of the turning-side electric motor 52 is converted into a force for causing the rack shaft 28 to linearly move in a reciprocating manner in the axial direction via the belt-type deceleration mechanism 58 and the ball screw mechanism 56. The turning wheels 42 can be turned by an axial force that is applied to the rack shaft 28.

A control apparatus 60 is configured to control the steering system 10, and operates the turning actuator 50 to control the turning angle that is a control quantity of the steering system 10. While maintaining the clutch 24 in a released state, the control apparatus 60 controls the steering system 10, and operates the drag actuator 30 to control the drag that is a control quantity of the steering system 10. In controlling the control quantities, the control apparatus 60 refers to a steering torque Th that is a torque that is detected by a torque sensor 70 and that is input via the steering wheel 22 by the driver, a rotational angle θs of a rotary shaft of the steering-side electric motor 36 that is detected by a steering-side rotational angle sensor 72, and a vehicle speed V that is detected by a vehicle speed sensor 74. The control apparatus 60 refers to a temperature TS of the steering system 10 that is detected by a temperature sensor 76, and a rotational angle θt of the output shaft 52a that is detected by a rotational angle sensor 78. It should be noted herein that the temperature TS may be a temperature of the turning-side electric motor 52, a temperature of the steering-side electric motor 36, a temperature of the inverter 54 or 38, a temperature of the ball screw mechanism 56, or the like. The temperature sensor 76 is attached to the control apparatus 60, and the control apparatus 60 is located close to the steering system 10, and thus, the temperature of the control apparatus 60 may be regarded as the temperature of the steering system 10. The control apparatus 60 refers to currents ius, ivs, and iws flowing through the steering-side electric motor 36, and currents iut, ivt, and iwt flowing through the turning-side electric motor 52. The currents ius, ivs, and iws may be detected as voltage drops at shunt resistors provided at legs of the inverter 38 respectively, and the currents iut, ivt, and iwt may be detected as voltage drops at shunt resistors provided at legs of the inverter 54 respectively.

The control apparatus 60 includes a CPU 62, a ROM 64, and a peripheral circuit 66, which can communicate with one another through a local network 68. The peripheral circuit 66 includes a circuit that generates a clock signal for prescribing internal operation, an electric power supply circuit, a reset circuit, and the like. In other words, the control apparatus 60 includes control circuitry.

Figure 2:
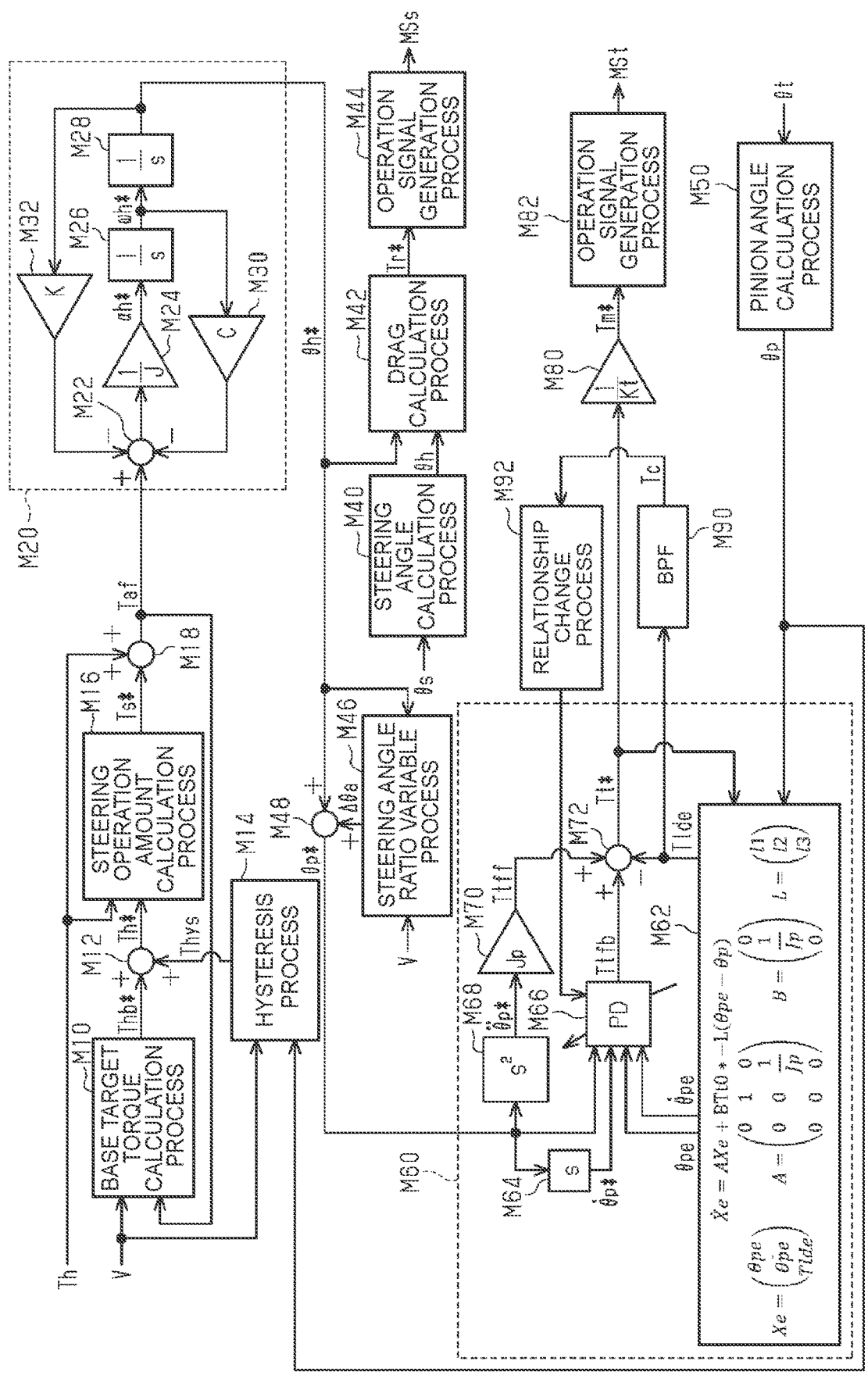
FIG. 2 is a block diagram showing processes that are performed by the control apparatus according to the embodiment.

FIG. 2 shows some of processes that are performed by the control apparatus 60. The processes shown in FIG. 2 are realized through the execution of a program stored in the ROM 64 by the CPU 62. The processes shown in FIG. 2 are performed when the clutch 24 is released.

A base target torque calculation process M10 is a process for calculating, based on an axial force Taf that will be described later, a base target torque Thb* that is a base value of a target steering torque Th* to be input to the input shaft 32 via the steering wheel 22 by the driver. It should be noted herein that the axial force Taf is a force applied to the rack shaft 28 in the axial direction. The axial force Taf is a quantity corresponding to a lateral force acting on the turning wheels 42, and thus, the lateral force can be determined from the axial force Taf. On the other hand, it is desirable to determine the torque to be input to the input shaft 32 via the steering wheel 22 by the driver, in accordance with the lateral force. Accordingly, the base target torque calculation process M10 is a process for calculating the base target torque Thb* in accordance with the lateral force determined from the axial force Taf.

More specifically, the base target torque calculation process M10 is a process for calculating the base target torque Thb* such that the absolute value of base target torque Thb* is smaller when the vehicle speed V is low than when the vehicle speed V is high even in the case where the absolute value of the axial force Taf remains unchanged. This can be realized through, for example, map computation for the base target torque Thb* performed by the CPU 62, in a state where the map data, which include the axial force Taf or a lateral acceleration determined from the axial force Taf and the vehicle speed V as input variables and the base target torque Thb* as an output variable, are stored in the ROM 64 in advance. It should be noted herein that the map data are set data including discrete values of the input variables and values of the output variable corresponding to the values of the input variables respectively. Map computation may be, for example, a process for adopting the corresponding value of the output variable in the map data as a computation result when the values of the input variables coincide with values of the input variables in the map data respectively, and adopting a value obtained through interpolation of the values of the output variable contained in the map data, as a computation result, when the values of the input variables do not coincide with values of the input variables in the map data respectively.

An addition process M12 is a process for calculating the target steering torque Th* by adding a hysteresis correction amount Thys to the base target torque Thb*. A hysteresis process M14 is a process for calculating and outputting a hysteresis correction amount Thys for correcting the base target torque Thb*, based on a pinion angle $\theta p$ that is a convertible angle that can be converted into a turning angle of the turning wheels 42. More specifically, the hysteresis process M14 includes a process for identifying whether the steering wheel 22 is turned in one direction or back in the other direction, based on changes in the pinion angle $\theta p$ and the like, and calculating the hysteresis correction amount Thys such that the absolute value of the target steering torque Th* becomes larger when the steering wheel 22 is turned in one direction than when the steering wheel 22 is turned back in the other direction. More specifically, the hysteresis process M14 includes a process for variably setting the hysteresis correction amount Thys in accordance with the vehicle speed V. The pinion angle $\theta p$ is a rotational angle of the pinion shaft 26.

A steering operation amount calculation process M16 is a process for calculating a steering operation amount Ts* that is an operation amount for controlling the steering torque Th to the target steering torque Th* through feedback. The steering operation amount Ts* is an amount including an operation amount for controlling the steering torque Th to the target steering torque Th* through feedback, but may include a feedforward term. The steering operation amount Ts* is an amount converted into a torque required to be applied to the input shaft 32 in controlling the steering torque Th to the target steering torque Th* through feedback.

An axial force calculation process M18 is a process for calculating the axial force Taf by adding the steering torque Th to the steering operation amount Ts*. The steering torque Th is a torque applied to the input shaft 32, and thus, the axial force Taf is a value obtained by converting a force applied in the axial direction of the rack shaft 28 in the case where the clutch 24 is assumed to be engaged into a torque applied to the input shaft 32, in the present embodiment.

A normative model computation process M20 is a process for calculating a steering angle command value $\theta h^*$ that is a command value of the steering angle $\theta h$, based on the axial force Taf. More specifically, the normative model computation process M20 is a process for calculating the steering angle command value $\theta h^*$ through the use of a model equation expressed as an equation (c1) shown below.

$$Taf = K \cdot \theta h^* + C \cdot \theta h^{*\prime} + J \cdot \theta h^{*\prime\prime} \quad (c1)$$

The model expressed as the above equation (c1) is the modelling of a value indicated by the steering angle $\theta h$ in the case where a torque equal in amount to the axial force Taf is input to the input shaft 32 when the clutch 24 is engaged. In the above equation (c1), a viscosity coefficient C is the modelling of the viscosity or the like of the steering system 10, an inertia coefficient J is the modelling of the inertia of the steering system 10, and an elastic coefficient K is the modelling of specifications such as suspension and wheel alignment of the vehicle provided with the steering system 10. This model is not a model accurately representing the actual steering system 10, and is a normative model designed to idealize the behavior of the steering angle with respect to the input. In the present embodiment, the steering feeling can be adjusted through the designing of the normative model.

More specifically, in a subtraction process M22, a viscosity term "$C \cdot \theta h^{*\prime}$" and a spring term "$K \cdot \theta h^*$" are subtracted from the axial force Taf. Through an inertia coefficient division process M24, an output of the subtraction process M22 is divided by the inertia coefficient J, and a steering angular acceleration command value $\alpha h^*$ ($=\theta h^{*\prime\prime}$) is calculated. Then, a steering angular speed command value $\omega h^*$ ($=\theta h^{*\prime}$) is calculated through an integration process M26, while using the steering angular acceleration command value $\alpha h^*$ as an input. A steering angle command value $\theta h^*$ is calculated through an integration process M28, while using the steering angular speed command value $\omega h^*$ as an input.

A viscosity coefficient multiplication process M30 is a process for calculating the viscosity term "$C \cdot \theta h^{*\prime}$" by multiplying the steering angular speed command value $\omega h^*$ by the viscosity coefficient C. An elastic coefficient multiplication process M32 is a process for calculating the spring term "$K \cdot \theta h^*$" by multiplying the steering angle command value $\theta h^*$ by the elastic coefficient K.

A steering angle calculation process M40 is a process for calculating a steering angle $\theta h$ that is a rotational angle of the steering wheel 22, based on an integrating process for the rotational angle $\theta s$ (i.e., a process of integrating the rotational angle $\theta s$). A drag calculation process M42 is a process for calculating, as a drag command value Tr*, a command value of a torque of the steering-side electric motor 36 as an operation amount for controlling the steering angle $\theta h$ to the steering angle command value $\theta h^*$ through feedback. An operation signal generation process M44 generates an operation signal MSs for operating the inverter 38, and outputs the generated operation signal MSs to the inverter 38, so as to control the torque of the steering-side electric motor 36 to the drag command value Tr*. More specifically, the operation signal generation process M44 is a process for operating an output line voltage of the inverter 38 by an operation amount for controlling the currents ius, ivs, and iws flowing through the steering-side electric motor 36 to a command value of a current determined from the drag command value Tr* through feedback.

A steering angle ratio variable process M46 is a process for variably setting, in accordance with the vehicle speed V, an adjustment amount $\Delta\theta a$ for making variable a steering angle ratio that is a ratio of a pinion angle command value $\theta p^*$ to the steering angle command value $\theta h^*$. More specifically, the adjustment amount $\Delta\theta a$ is set in such a manner as to make changes in the pinion angle command value $\theta p^*$ with respect to changes in the steering angle command value $\theta h^*$ larger when the vehicle speed V is low than when the vehicle speed V is high. In an addition process M48, the pinion angle command value $\theta p^*$ is set by adding the adjustment amount $\Delta\theta a$ to the steering angle command value $\theta h^*$.

A pinion angle calculation process M50 is a process for calculating the pinion angle θp based on a cumulative process for the rotational angle θt of the turning-side electric motor 52. When equal to "0", the pinion angle θp indicates that the vehicle travels straight. The pinion angle θp indicates a turning angle toward the right side or a turning angle toward the left side, depending on whether the sign of the pinion angle θp is positive or negative.

A turning operation amount calculation process M60 is a process for calculating a turning operation amount Tt* that is an operation amount for controlling the pinion angle θp to the pinion angle command value θp* through feedback. The turning operation amount Tt* is an amount corresponding to a required torque of the turning-side electric motor 52 (i.e., a torque required of the turning-side electric motor 52) in controlling the pinion angle θp to the pinion angle command value θp* through feedback, and is an amount converted into a torque applied to the pinion shaft 26 in the case where the torque is assumed to be applied to the pinion shaft 26 in the present embodiment.

The turning operation amount calculation process M60 includes a disturbance torque calculation process M62 for estimating, as a disturbance torque, a torque influencing the pinion angle θp other than the turning operation amount Tt*, and adopting this value as an estimated disturbance torque Tlde. In the present embodiment, the estimated disturbance torque Tlde is converted into a torque applied to the pinion shaft 26 in the case where the disturbance torque is assumed to be applied to the pinion shaft 26.

In the disturbance torque calculation process M62, the estimated disturbance torque Tlde and an estimated value θpe are calculated according to an equation (c2) shown below, through the use of an inertia coefficient Jp, the pinion angle θp, the turning operation amount Tt*, and a 3-row, 1-column matrix L prescribing observer gains 11, 12, and 13. The inertia coefficient Jp is the modelling of the inertia of the steering system 10, and is a value representing the actual inertia of the steering system 10 with higher accuracy than the inertia coefficient J.

$$\dot{X}e = AXe + BTt0* - L(\theta pe - \theta p) \tag{c2}$$

$$Xe = \begin{pmatrix} \theta pe \\ \dot{\theta} pe \\ Tlde \end{pmatrix} \quad A = \begin{pmatrix} 0 & 1 & 0 \\ 0 & 0 & \frac{1}{Jp} \\ 0 & 0 & 0 \end{pmatrix} \quad B = \begin{pmatrix} 0 \\ \frac{1}{Jp} \\ 0 \end{pmatrix} \quad L = \begin{pmatrix} l1 \\ l2 \\ l3 \end{pmatrix}$$

A differential computation process M64 is a process for calculating a pinion angular speed command value through differential computation on the pinion angle command value θp*.

A feedback term calculation process M66 is a process for calculating a feedback term Ttfb that is the sum of a proportional term corresponding to a difference between the pinion angle command value θp* and the estimated value θpe, and a differential term corresponding to a difference between a first-order time differential value of the pinion angle command value θp* and a first-order time differential value of the estimated value θpe.

A second-order differential process M68 is a process for calculating a second-order time differential value of the pinion angle command value θp*. A feedforward term calculation process M70 is a process for calculating a feedforward term Ttff by multiplying an output value of the second-order differential process M68 by the inertia coefficient Jp. A two-degree-of-freedom operation amount calculation process M72 is a process for calculating the turning operation amount Tt* by subtracting the estimated disturbance torque Tlde from the sum of the feedback term Ttfb and the feedforward term Ttff.

A conversion process M80 is a process for converting the turning operation amount Tt* into a torque command value Tm* that is a command value of the torque of the turning-side electric motor 52, by dividing the turning operation amount Tt* by a deceleration ratio Kt.

An operation signal generation process M82 is a process for generating and outputting an operation signal MSt of the inverter 54 for controlling the torque of the turning-side electric motor 52 to the torque command value Tm*. More specifically, the operation signal generation process M82 is a process for operating the output line voltage of the inverter 54 by an operation amount for controlling the currents iut, ivt, and iwt flowing through the turning-side electric motor 52 to a command value of a current determined from the torque command value Tm* through feedback. The operation signal MSt is actually an operation signal for each of arms at each of the legs of the inverter 54.

Figure 3:
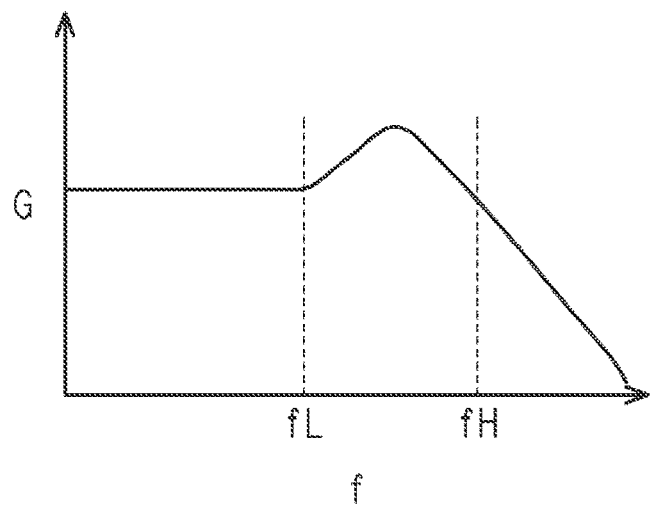
FIG. 3 is a view showing frequency response characteristics of the steering system according to the embodiment.

A bandpass filter M90 performs a process for extracting a specific frequency component of the estimated disturbance torque Tlde, while using the estimated disturbance torque Tlde as an input. The specific frequency component will now be described. FIG. 3 shows frequency response characteristics of the steering system 10. More specifically, the axis of abscissa in FIG. 3 represents frequency f, and the axis of ordinate in FIG. 3 represents a gain G in the case where the input to the steering system 10 is a displacement such as a change in turning angle and the output from the steering system 10 is a torque of the turning-side electric motor 52 that is a force required for the displacement. As shown in FIG. 3, the gain G is large when the frequency is between a lower-limit frequency fL and an upper-limit frequency fH. This results from the viscosity of the steering system 10. Moreover, the large gain G resulting from viscosity means that the responsiveness of changes in turning angle to the torque of the turning-side electric motor 52 is low.

In extracting the viscosity component of the steering system 10, it is desirable to set the center frequency allowed to pass through the bandpass filter M90 to, for example, "7 to 9 Hz". Further, it is desirable to set the band width to, for example, "4 to 6 Hz".

Figure 4:
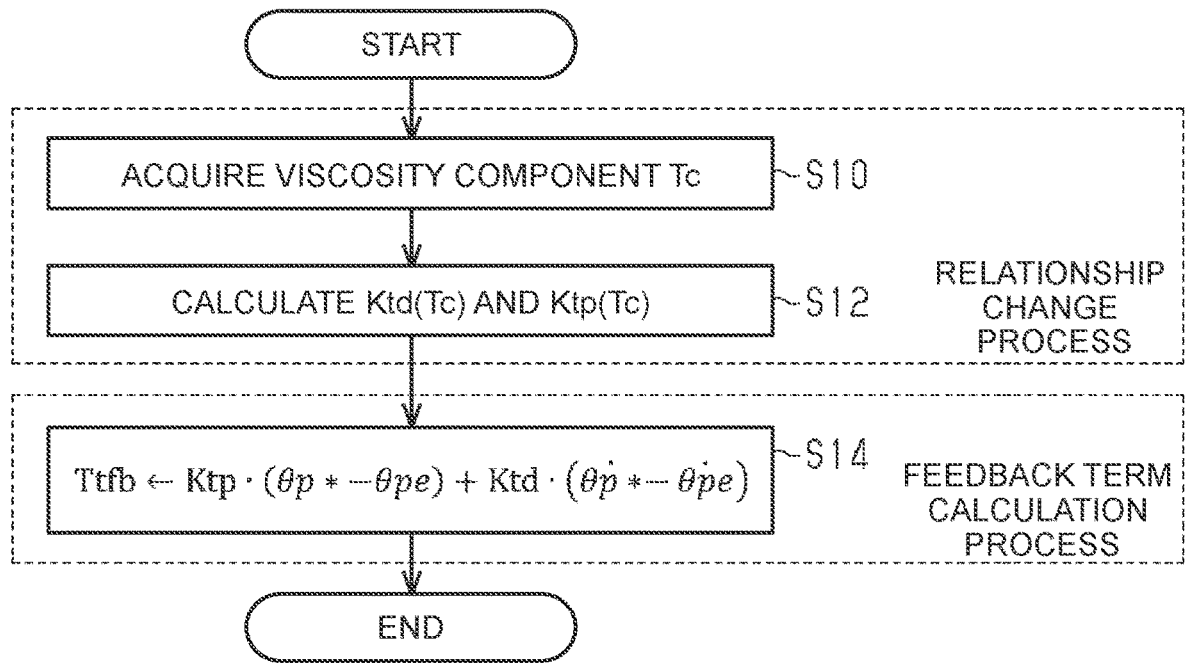
FIG. 4 is a flowchart showing the procedure of the processes that are performed by the control apparatus according to the embodiment.

Referring again to FIG. 2, a relationship change process M92 is a process for changing the gain of the feedback term calculation process M66 based on a viscosity component Tc output by the bandpass filter M90. FIG. 4 shows the procedure of the relationship change process M92 and the feedback term calculation process M66. Step numbers of the respective processes are expressed by numerals preceded by "S" in the following description.

In the series of the processing contents shown in FIG. 4, the CPU 62 first acquires the viscosity component Tc (S10). Subsequently, the CPU 62 variably sets the proportional gain Ktp and the differential gain Ktd in the feedback term calculation process M66, in accordance with the viscosity component Tc (S12). It should be noted herein that the CPU 62 sets the proportional gain Ktp and the differential gain Ktd in such a manner as to make the responsiveness of the pinion angle θp to changes in the pinion angle command value θp* higher when the viscosity component Tc is large than when the viscosity component Tc is small. The processing of S10 and the processing of S12 correspond to the relationship change process M92.

Subsequently, the CPU 62 substitutes the sum of a value obtained by multiplying the difference between the pinion angle command value θp* and the estimated value θpe by the proportional gain Ktp and a value obtained by multiplying the difference between the first-order time differential value of the pinion angle command value θp* and the first-order time differential value of the estimated value θpe by the differential gain Ktd, for the feedback term Ttfb (S14). This processing corresponds to the feedback term calculation process M66.

The CPU 62 ends the series of the processing contents shown in FIG. 4 when the processing of S14 is completed. The operation and effect of the present embodiment will now be described.

The CPU 62 sets the steering angle command value θh* and the pinion angle command value θp* based on a normative model, controls the steering angle θh to the steering angle command value θh* through feedback, and controls the pinion angle θp to the pinion angle command value θp* through feedback. It should be noted herein that the turning operation amount Tt* that is an operation amount for controlling the pinion angle θp to the pinion angle command value θp* is a value obtained by subtracting the estimated disturbance torque Tlde from the feedforward term Ttff and the feedback term Ttfb. It should be noted herein that the feedforward term Ttff is an amount for compensating for the influence of the inertia of the steering system 10, and is not an amount for compensating for the viscosity of the steering system 10. Accordingly, the estimated disturbance torque Tlde includes the viscosity component of the steering system 10.

The CPU 62 variably sets the proportional gain Ktp and the differential gain Ktd of the feedback term calculation process M66 in accordance with the viscosity component Tc, while using an output value of the bandpass filter M90 to which the estimated disturbance torque Tlde is input, as the viscosity component Tc. Thus, the responsiveness of the pinion angle θp to changes in the pinion angle command value θp* can be restrained from decreasing, when the viscosity component Tc is large.

According to the present embodiment described above, the following operation and effect are further obtained. (1) A so-called steer-by-wire system that can shut off the transmission of power between the steering wheel 22 and the turning wheels 42 is used as the steering system 10. In this case, when responsiveness of the pinion angle θp to changes in the pinion angle command value θp* decreases as a result of the viscosity of the steering system 10, the responsiveness of the turning of the turning wheels 42 to the operation of the steering wheel 22 decreases. Thus, the driver may feel uncomfortable, for example, the driver may feel that consistency between the operation of the steering wheel 22 and the turning of the turning wheels 42 decreases. Therefore, the utility value of the process for variably setting the proportional gain Ktp and the differential gain Ktd based on the viscosity component Tc is particularly great.

Second Embodiment

The second embodiment will be described hereinafter with reference to the drawings, focusing on differences from the first embodiment.

Figure 5:
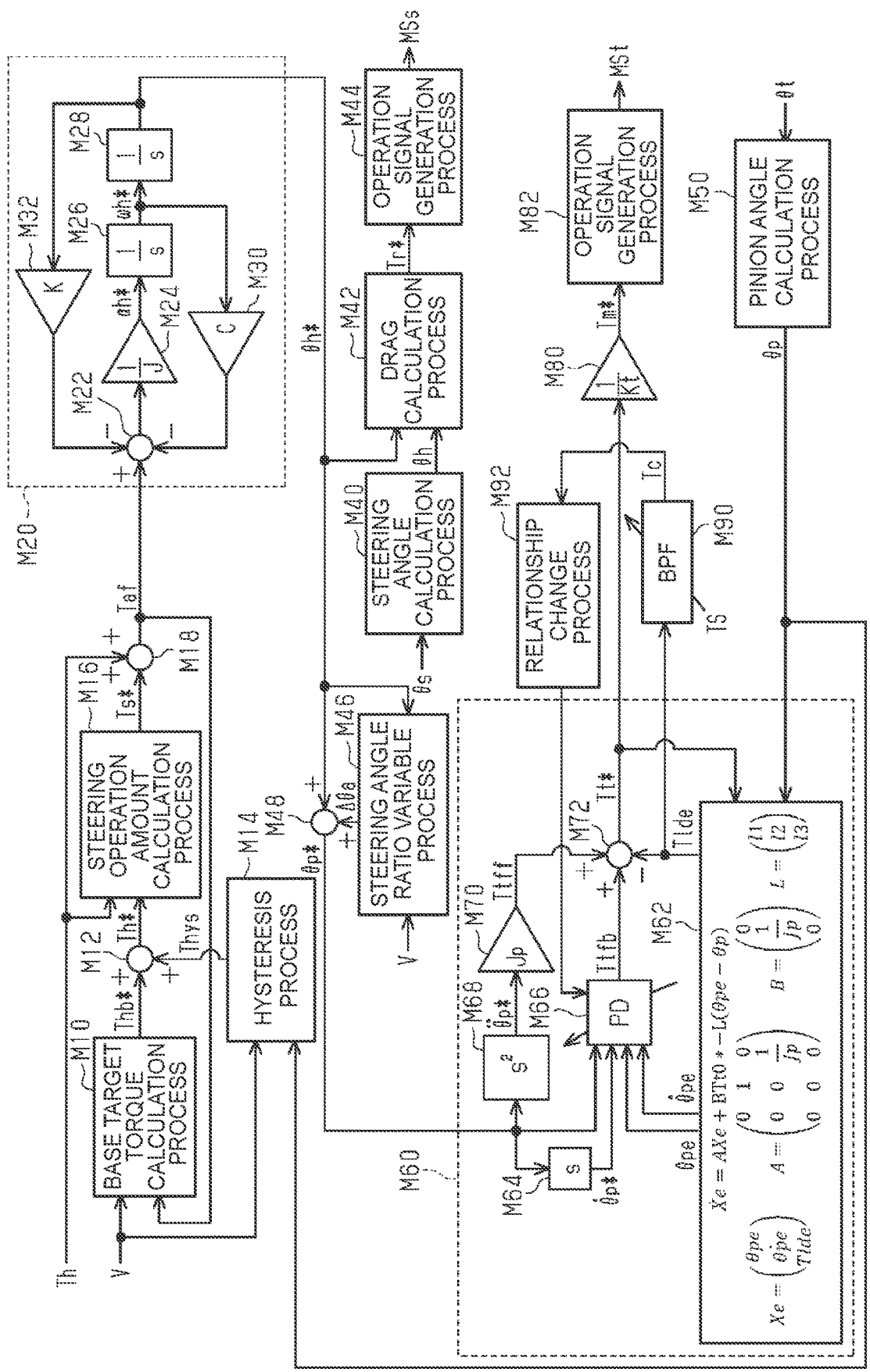
FIG. 5 is a block diagram showing processes that are performed by a control apparatus according to a second embodiment.

FIG. 5 shows processes that are performed by the control apparatus 60 according to the present embodiment. For the sake of convenience, the processes corresponding to those shown in FIG. 2 are denoted by the same reference symbols respectively in FIG. 5. As shown in FIG. 5, in the present embodiment, the CPU 62 makes the filtering characteristics of the bandpass filter M90 variable in accordance with the temperature TS. More specifically, the intensity of the viscosity component Tc is made higher when the temperature TS is low than when the temperature TS is high.

This is based on the fact that a lubricant such as grease for the steering system 10 is solidified and the viscosity is high when the temperature is low. The bandpass filter M90 makes the output value larger when the intensity of the viscosity component included in the estimated disturbance torque Tlde is high than when the intensity of the viscosity component included in the estimated disturbance torque Tlde is low. Thus, even in the case where the filtering characteristics are not variable, the intensity of the viscosity component Tc output by the bandpass filter M90 is higher when the temperature TS is low than when the temperature TS is high. In contrast, according to the present embodiment, the filtering characteristics are made variable in accordance with the temperature TS, and the intensity of the viscosity component Tc in the case where the temperature TS is low is made higher than when the filtering characteristics are not made variable. Thus, when the temperature TS is low, the feedback term Tab in the feedback term calculation process M66 can be changed to a value for further enhancing the responsiveness of the pinion angle θp to changes in the pinion angle command value θp*.

Third Embodiment

The third embodiment will be described hereinafter with reference to the drawings, focusing on differences from the first embodiment.

Figure 6:
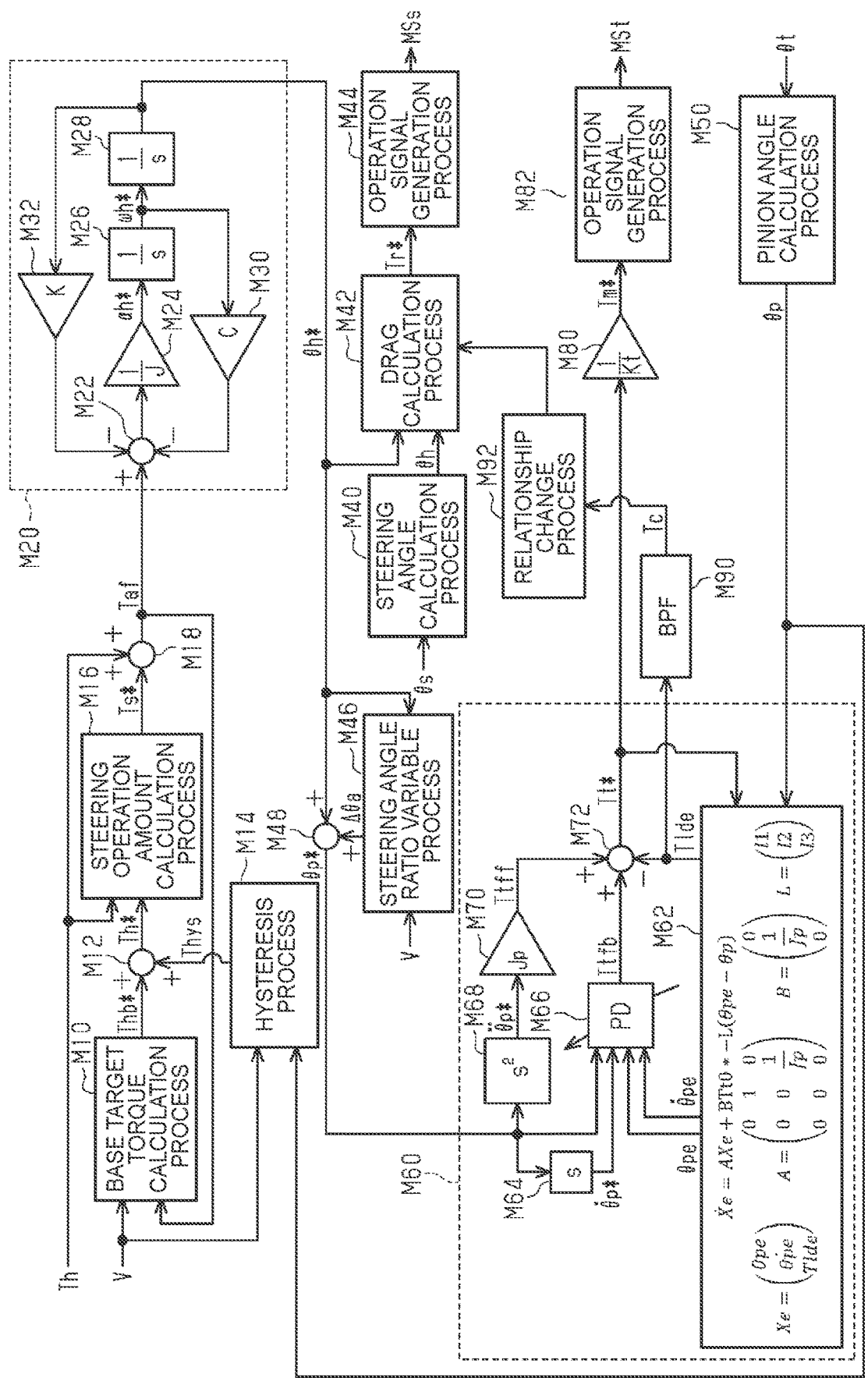
FIG. 6 is a block diagram showing processes that are performed by a control apparatus according to a third embodiment.

FIG. 6 shows processes that are performed by the control apparatus 60 according to the present embodiment. For the sake of convenience, the processes corresponding to those shown in FIG. 2 are denoted by the same reference symbols respectively in FIG. 6. As shown in FIG. 6, in the present embodiment, the relationship change process M92 is a process for changing gains in the drag calculation process M42, instead of the gain in the feedback term calculation process M66.

Figure 7:
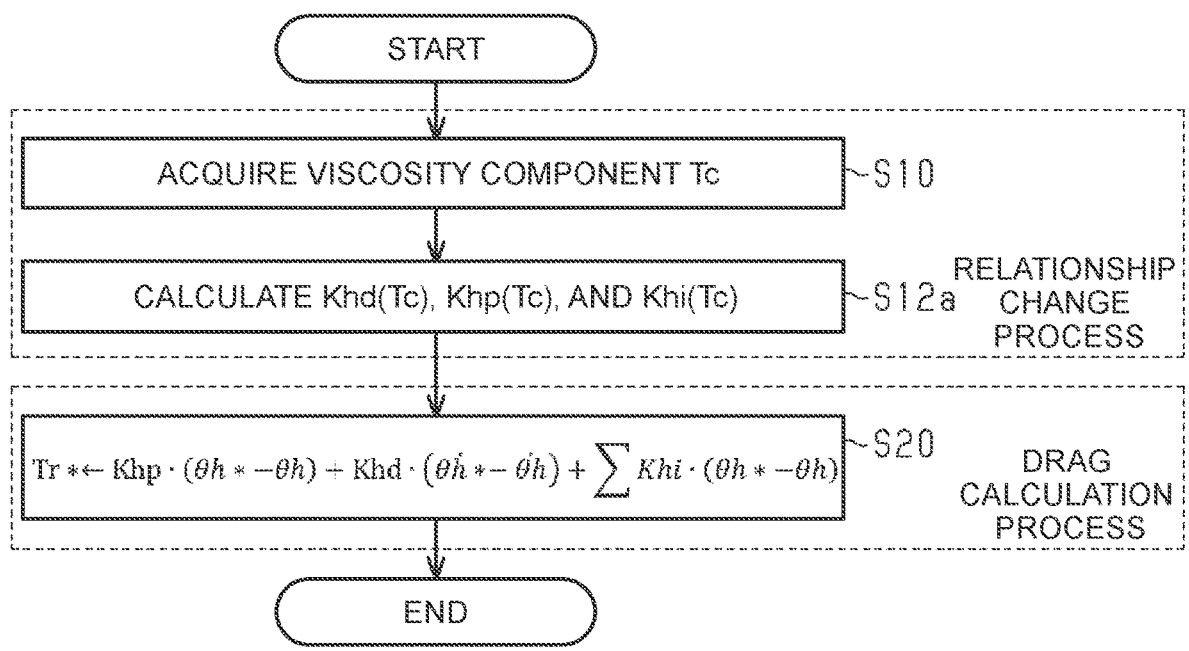
FIG. 7 is a flowchart showing the procedure of the processes that are performed by the control apparatus according to the embodiment.

FIG. 7 shows the procedure of the relationship change process M92 and the drag calculation process M42. For the sake of convenience, the processing contents shown in FIG. 7 that correspond to those in FIG. 4 are denoted by the same step numbers respectively. In a series of the processing contents shown in FIG. 7, the CPU 62 variably sets a proportional gain Khp, a differential gain Khd, and an integral gain Khi in the drag calculation process M42 in accordance with the viscosity component Tc when the processing of S10 is completed (S12a). The CPU 62 sets the proportional gain Khp, the differential gain Khd, and the integral gain Khi such that the responsiveness of the steering angle θh to changes in the steering angle command value θh* becomes lower when the viscosity component Tc is large than when the viscosity component Tc is small. The processing of S10 and the processing of S12a correspond to the relationship change process M92.

Subsequently, the CPU 62 substitutes the sum of a value obtained by multiplying the difference between the steering angle command value θh* and the steering angle θh by the proportional gain Khp, a value obtained by multiplying the difference between the first-order time differential value of the steering angle command value θh* and the first-order time differential value of the steering angle θh by the differential gain Khd, and an integral value of a value obtained by multiplying the difference between the steering angle command value θh* and the steering angle θh by the integral gain Khi, for the drag command value Tr* (S20). This processing corresponds to the drag calculation process M42.

The CPU 62 ends the series of the processing contents shown in FIG. 7 when the processing of S20 is completed. The operation and effect of the present embodiment will now be described.

The CPU 62 sets the gains in the drag calculation process M42 such that the responsiveness of the steering angle θh to changes in the steering angle command value θh* decreases when the viscosity component Tc is large. Thus, the drag against the operation of the steering wheel 22 can be increased under the circumstances where the responsiveness of the pinion angle θp to changes in the pinion angle command value θp* decreases as a result of the viscosity of the steering system 10. Then, the driver can thus be informed that there is a situation where a larger force is needed to turn the turning wheels 42. Further, the driver can perform the operation of turning the steering wheel 22 without perceiving a decrease in consistency between this operation and the turning of the turning wheels 42.

Fourth Embodiment

The fourth embodiment will be described hereinafter with reference to the drawings, focusing on differences from the first embodiment.

Figure 8:
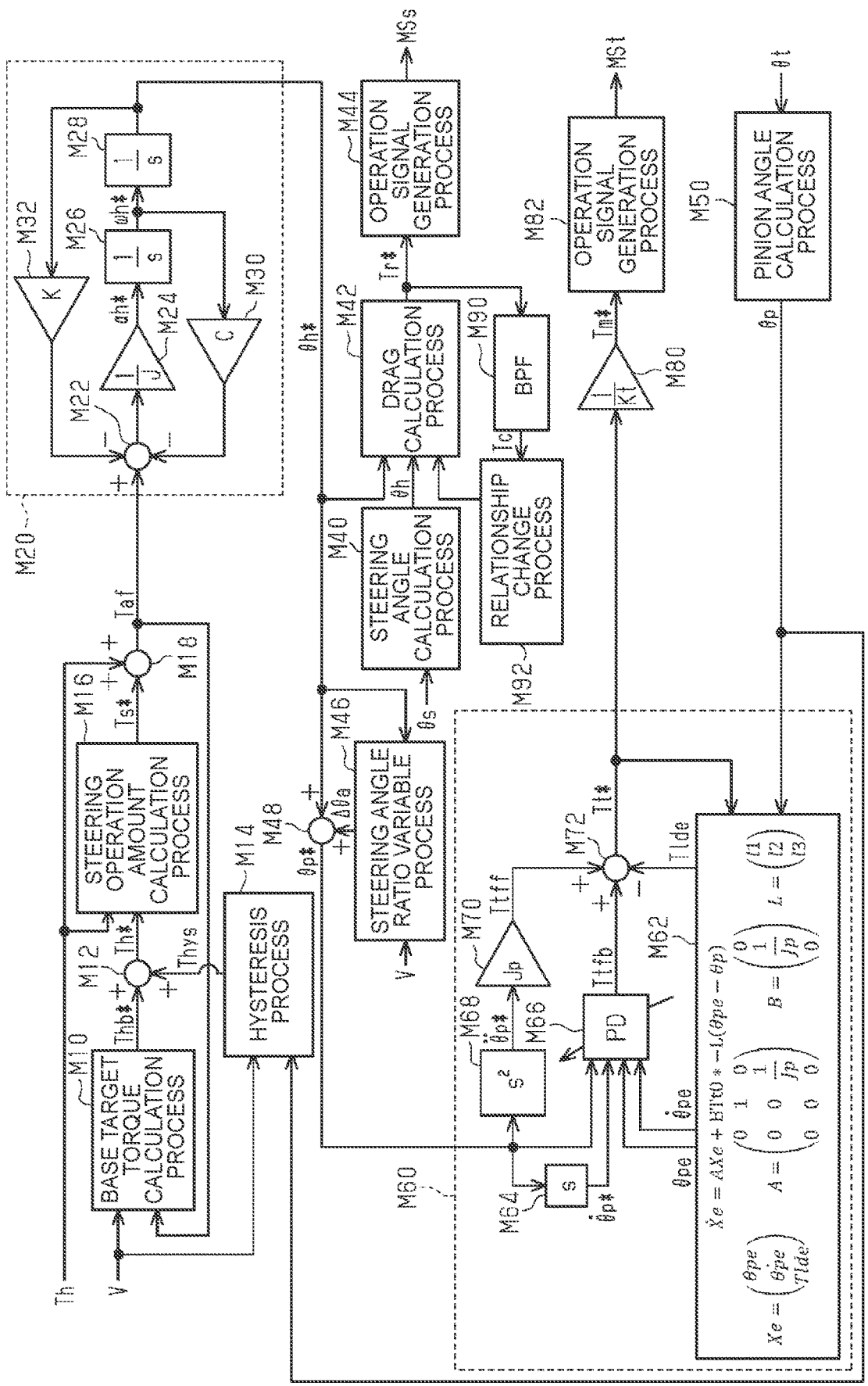
FIG. 8 is a block diagram showing processes that are performed by a control apparatus according to a fourth embodiment.

FIG. 8 shows processes that are performed by the control apparatus 60 according to the present embodiment. For the sake of convenience, the processes corresponding to those shown in FIG. 2 are denoted by the same reference symbols respectively in FIG. 8. As shown in FIG. 8, the bandpass filter M90 according to the present embodiment performs a process for outputting the viscosity component included in the drag command value Tr* as the viscosity component Tc, while using the drag command value Tr* as an input. The relationship change process M92 is a process for variably setting the gains in the drag calculation process M42 based on the viscosity component Tc included in the drag command value Tr*.

The relationship change process M92 and the drag calculation process M42 according to the present embodiment are the same as those shown in FIG. 7 respectively. It should be noted, however, that the CPU 62 sets the proportional gain Khp, the differential gain Khd, and the integral gain Khi in such a manner as to restrain the responsiveness of the steering angle θh to changes in the steering angle command value θh* from decreasing due to the viscosity component Tc, in the processing of S12a.

That is, in the case where the responsiveness of the pinion angle θp to changes in the pinion angle command value θp* is high when the displacement of the steering wheel 22 is small relative to the torque input to the steering wheel 22 due to viscosity, the driver may feel uncomfortable, for example, the driver may feel that consistency between the operation of the steering wheel 22 and the turning of the turning wheels 42 decreases. As a measure against this, in the present embodiment, the driver can be restrained from feeling uncomfortable, by restraining the responsiveness of the steering angle θh to changes in the steering angle command value θh* from decreasing due to the viscosity component Tc.

Fifth Embodiment

The fifth embodiment will be described hereinafter with reference to the drawings, focusing on differences from the fourth embodiment.

Figure 9:
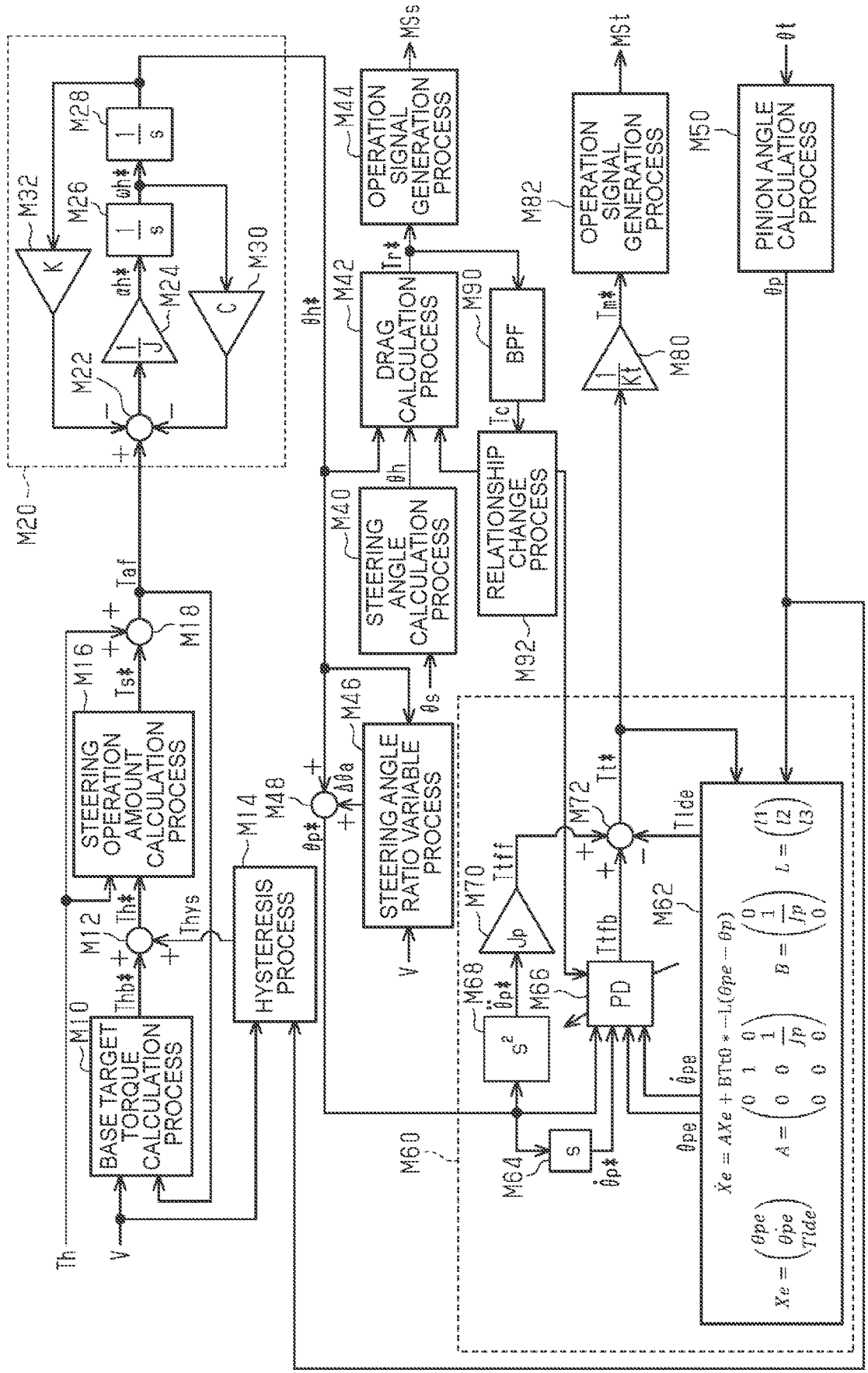
FIG. 9 is a block diagram showing processes that are performed by a control apparatus according to the fifth embodiment.

FIG. 9 shows processes that are performed by the control apparatus 60 according to the present embodiment. For the sake of convenience, the processes corresponding to those shown in FIG. 8 are denoted by the same reference symbols respectively in FIG. 9. In the present embodiment, the relationship change process M92 is a process for variably setting the gains in the feedback term calculation process M66 in accordance with the viscosity component Tc of the drag command value Tr*. The relationship change process M92 and the feedback term calculation process M66 according to the present embodiment are the same as those shown in FIG. 4 respectively. It should be noted, however, that the CPU 62 changes the gains such that the responsiveness of the pinion angle θp to changes in the pinion angle command value θp* is lower when the viscosity component Tc is large than when the viscosity component Tc is small.

That is, in the case where the responsiveness of the pinion angle θp to changes in the pinion angle command value θp* is high when the displacement of the steering wheel 22 is small relative to the torque input to the steering wheel 22 due to viscosity, the driver may feel uncomfortable, for example, the driver may feel that consistency between the operation of the steering wheel 22 and the turning of the turning wheels 42 decreases. As a measure against this, in the present embodiment, the responsiveness of the pinion angle θp to changes in the pinion angle command value θp* can be lowered when the displacement of the steering wheel 22 is small relative to the torque input to the steering wheel 22 due to viscosity. Therefore, the driver can be restrained from feel uncomfortable.

Corresponding Relationship

A corresponding relationship between the matters in the foregoing embodiments and the matters described in the section of "Summary" is as follows. The corresponding relationship is described for each of the numbers mentioned in the section of "Summary".

[1] The angle control process corresponds to the turning operation amount calculation process M60 in FIGS. 2, 5, and 6 and the drag calculation process M42 in FIGS. 8 and 9. The predetermined component calculation process corresponds to the disturbance torque calculation process M62 and the bandpass filter M90. [2, 3] The viscosity component calculation process corresponds to the disturbance torque calculation process M62 and the bandpass filter M90. [4] The filtering process corresponds to the disturbance torque calculation process M62 and the bandpass filter M90. [5] This corresponds to the process of FIG. 5. [6] The convertible angle corresponds to the pinion angle θp. [7] The control unit corresponds to the turning operation amount calculation process M60, the conversion process M80, and the operation signal generation process M82. [8] This corresponds to the configuration in which power between the steering wheel 22 and the turning wheels 42 can be shut off by the clutch 24. [9] The control unit corresponds to the drag calculation process M42 and the operation signal generation process M44. [10] This corresponds to FIGS. 8 and 9. [11] The control unit corresponds to the drag calculation process M42 and the operation signal generation process M44. [12] The control unit corresponds to the turning operation amount calculation process M60, the conversion process M80, and the operation signal generation process M82.

Other Embodiments

The present embodiments can be carried out after being modified as follows. The present embodiments and the following modification examples can be carried out in combination with one another within such a range that there is no technical contradiction.

As for Relationship Change Process

The process for changing the relationship between the input and the output of the control unit configured to control the turning-side electric motor 52 is not limited to that described in the foregoing embodiments. For example, a filter may be provided downstream of the addition process M48, and a time constant of the filter may be variably set in accordance with the viscosity component Tc. It is thus possible to compensate for a delay in the responsiveness of changes in the pinion angle θp to changes in the output value of the addition process M48 by, for example, advancing the phase of the pinion angle command value θp*. Besides, for example, the gains of current feedback control in the operation signal generation process M82 may be made variable. More specifically, for example, in the case where a control unit configured to control a q-axis current flowing through the turning-side electric motor 52 to a command value thereof through feedback is constituted by a proportional element and an integral element, the proportional gain and the integral gain may be made variable in accordance with the viscosity component Tc. The process for changing the relationship between the input and the output of the control unit configured to control the turning-side electric motor 52 is also appropriately applicable to a steering system in which the input shaft 32 is mechanically coupled to the pinion shaft 26 via a variable gear ratio mechanism that makes a gear ratio variable, and a steering system in which the input shaft 32 and the pinion shaft 26 rotate integrally with each other, as mentioned below in the section of "As for Steering system".

The process for changing the relationship between the input and the output of the control unit for the steering-side electric motor 36 is not limited to that exemplified in the foregoing embodiments. For example, the viscosity coefficient C, the inertia coefficient J, and the elastic coefficient K in the normative model computation process M20 may be changed in accordance with the viscosity component Tc. It is thus possible to make the responsiveness of the steering angle command value θh* to the axial force Taf lower or higher than, for example, in the case where the viscosity coefficient C, the inertia coefficient J, and the elastic coefficient K are not changed. Besides, for example, the gains of current feedback control in the operation signal generation process M44 may be made variable. More specifically, for example, in the case where the control unit configured to control the q-axis current flowing through the turning-side electric motor 52 to the command value thereof through feedback is constituted by the proportional element and the integral element, the proportional gain and the integral gain may be made variable in accordance with the viscosity component Tc. Besides, the correction amount of an assist torque may be variably set in accordance with the viscosity component Tc in the case where the steering angle command value θh* is not calculated, as mentioned below in the section of "As for Control Unit for Steering-side Electric Motor 36". It is thus possible to appropriately compensate for the uncomfortable feeling of the driver due to the influence of the viscosity of the steering system 10 on the controllability of the steering system 10.

Both the two processes, namely, the process for changing the relationship between the input and the output of the control unit for the turning-side electric motor 52 and the process for changing the relationship between the input and the output of the control unit for the steering-side electric motor 36 may be performed instead of performing only one of the processes. In this case, both the processes may be performed based on, for example, the viscosity component Tc in controlling the turning-side electric motor 52 exemplified in FIG. 2 and the like. Alternatively, both the processes may be performed based on, for example, the viscosity component Tc regarding the control of the steering-side electric motor 36 exemplified in FIG. 8 and the like. However, the disclosure is not limited to these cases. For instance, one of the foregoing two processes may be performed based on the viscosity component Tc in controlling the turning-side electric motor 52, and the other process may be performed based on the viscosity component Tc regarding the control of the steering-side electric motor 36.

The influence of a friction component of the steering system 10 on a feeling of steering can be compensated for, by changing the relationship of the output from the control unit configured to control the torque of the steering-side electric motor 36 to the input to the control unit in the case where the friction component of the steering system is calculated, as mentioned below in the section of "As for Predetermined Component Calculation Process". It should be noted herein that the process for changing the relationship of the output from the control unit configured to control the torque of the steering-side electric motor 36 to the input to the control unit may be, for example, a process for changing the hysteresis correction amount Thys in accordance with the friction component. Besides, the influence of the friction component of the steering system 10 on the feeling of steering can be compensated for, by changing the relationship of the output from the control unit configured to control the torque of the turning-side electric motor 52 to the input to the control unit in the case of the steering system in which the input shaft 32 and the pinion shaft 26 rotate integrally with each other, as mentioned in, for example, the section of "As for Steering system". It should be noted herein that the process for changing the relationship of the output from the control unit configured to control the torque of the turning-side electric motor 52 to the input to the control unit may be, for example, a process for changing the hysteresis correction amount Thys in accordance with the friction component.

As for Intensity Change Process

In the process of FIG. 5, the filtering characteristics are changed such that the viscosity component Tc becomes larger when the temperature TS is low than when the temperature TS is high, but the disclosure is not limited thereto. For example, the filtering characteristics may be changed such that the viscosity component Tc becomes smaller when the temperature TS is low than when the temperature TS is high. In any case, the changing of the filtering characteristics in this manner is equivalent to changing the proportional gain Ktp and the differential gain Ktd in accordance with both the viscosity component Tc and the temperature TS, and thus, the degree of freedom of the process for changing the proportional gain Ktp and the differential gain Ktd can be enhanced.

The process for changing the filtering characteristics in accordance with the temperature TS is not limited to the process for extracting the viscosity component Tc in the turning-side electric motor 52-side. The temperature serving as the input in changing the filtering characteristics is not limited to the detection value of the temperature sensor 76. For example, this temperature may be estimated from the history of the current flowing through the turning-side electric motor 52 and the steering-side electric motor 36. Besides, for example, this temperature may be estimated from the history of the current flowing through parts in the control apparatus 60. Besides, a detection value of a sensor that detects an outside air temperature may be utilized in estimating the temperature.

As for Disturbance Torque Calculation Process

In the foregoing embodiments, the disturbance torque calculation process M62 is utilized to calculate the turning operation amount Tt*, but the disclosure is not limited thereto. The disturbance torque calculation process M62 may be utilized to calculate the viscosity component Tc, but may not be used to calculate the turning operation amount Tt*.

As for Viscosity Component Calculation Process

In FIGS. 2, 5, and 6, the viscosity component Tc is calculated through the use of the output of the disturbance torque calculation process M62 constituted by an observer, but the disturbance torque calculation process is not limited thereto. For example, the disturbance torque calculation process may be configured through the use of a Kalman filter.

The process for estimating the viscosity component Tc in controlling the turning-side electric motor 52 does not necessarily include the process for estimating the disturbance torque component while using the value of the variable (the turning operation amount Tt*) regarding the torque of the turning-side electric motor 52, the pinion angle θp, and the pinion angle command value θp* as inputs. For example, in the case where feedback control for controlling the feedback control quantity to the pinion angle command value θp* as a command value is performed, the viscosity component Tc may be extracted by allowing selective transmission of a specific frequency component of a command value of a torque such as the turning operation amount Tt* as an operation amount of feedback control, and/or a specific frequency component of a command value of a current. Besides, in consideration of the fact that the current is controlled to the command value, in the case where feedback control for controlling the feedback control quantity to the pinion angle command value θp* as the command value is performed, the viscosity component Tc may be extracted by allowing selective transmission of a specific frequency component of the current actually flowing through the turning-side electric motor 52. The torque and current as operation amounts for angle feedback control regarding the turning angle are control quantities for the turning-side electric motor 52. Thus, the command values of the torque and current as well as the torque and current are variables regarding the control quantities for the turning-side electric motor 52.

The process for estimating the viscosity component Tc in controlling the steering-side electric motor 36 does not necessarily use the drag command value Tr*. For example, in the case where feedback control for controlling the feedback control quantity to the steering angle command value θh* as the command value is performed, the viscosity component Tc may be extracted by allowing selective transmission of a specific frequency component of a command value of a current in the operation signal generation process M44. The torque and current as operation amounts for angle feedback control regarding the steering angle are control quantities for the steering-side electric motor 36, and thus, the command values of the torque and current as well as the torque and current are variables regarding the control quantities for the steering-side electric motor 36. Besides, for example, the drag calculation process M42 may be constituted by a process for calculating a feedforward term and a feedback term, and a process for calculating a disturbance torque, and the viscosity component Tc may be extracted from the disturbance torque. Besides, the disturbance torque may not be used to calculate the drag command value Tr*, and a disturbance torque may be calculated to calculate the viscosity component Tc.

The filtering process does not necessarily use the band-pass filter M90. For example, a low pass filter with a cutoff frequency higher than a frequency range of the viscosity component exemplified in the foregoing embodiments may be used. In this case, the output of the filtering process includes the viscosity component and the friction component.

As for Predetermined Component Calculation Process

The predetermined component used in changing the relationship of the output from the control unit for the steering system to the input to the control unit does not necessarily include the viscosity component. For example, the predetermined component calculation process may be constituted by both a low pass filter for extracting a friction component and a bandpass filter for extracting a viscosity component, and the relationship may be changed individually by the friction component and the viscosity component. However, only the friction component may be calculated without calculating the viscosity component as the predetermined component.

As for Turning Angle Feedback Process

In the foregoing embodiments, the feedforward term Ttff is calculated based on the second-order time differential value of the pinion angle command value θp*, but the disclosure is not limited thereto. For example, the feedforward term Ttff may be calculated based on the second-order time differential value of the pinion angle θp or the second-order time differential value of the estimated value θpe.

In the foregoing embodiments, the feedforward term is calculated by modelling the steering system 10 with a simple model in which the torque applied to the turning wheels 42 is equal to the torque proportional to the angular acceleration of the turning angle, but the disclosure is not limited thereto. For example, the feedforward term may be calculated through the use of a model in which the torque applied to the turning wheels 42 is equal to the sum of the torque proportional to the angular acceleration of the turning angle and the viscosity that is the torque proportional to the angular speed of the turning angle. This can be realized by, for example, adopting the sum of a value obtained by multiplying the second-order time differential value of the pinion angle command value θp* by the inertia coefficient Jp and a value obtained by multiplying the first-order time differential value of the pinion angle command value θp* by the viscosity coefficient Cp, as the feedforward term Ttff. It should be noted herein that the viscosity coefficient Cp that is the proportional coefficient of the angular speed is different in aim from the viscosity coefficient C used in the normative model computation process M20, and is desired to be obtained by modelling the actual behavior of the steering system 10 as accurately as possible. In this case, the disturbance torque calculation process M62 may be configured through the use of a model in which the torque applied to the turning wheels 42 is equal to the sum of the torque proportional to the angular acceleration of the turning angle and the viscosity component. In this case as well, when there is a discrepancy between the viscosity component of the feedforward term Ttff and the actual viscosity component, the estimated disturbance torque Tlde includes the viscosity component, and thus, the viscosity component Tc can be extracted from the estimated disturbance torque Tlde.

The feedback control quantity as one of the inputs to the feedback term calculation process M66 is not limited to the estimated value θpe or the first-order time differential value thereof. For example, the feedback control quantity may be the pinion angle θp or the time differential value thereof itself, instead of the estimated value θpe or the first-order time differential value thereof.

The feedback term calculation process M66 is not limited to the process for outputting the sum of the output values of the proportional element and the differential element. For example, the feedback term calculation process M66 may be a process for outputting the output value of the proportional element, or a process for outputting the output value of the differential element. Furthermore, for example, the feedback term calculation process M66 may be a process for outputting the sum of the output value of the integral element and at least one of the output value of the proportional element and the output value of the differential element. In the case where the output value of the integral element is used, it is desirable to remove the disturbance torque calculation process M62. However, the use itself of the disturbance torque calculation process M62 is not indispensable when the output value of the integral element is not used.

The steering angle ratio variable process M46 and the addition process M48 may be removed, and the output of the normative model computation process M20 may be both the steering angle command value θh* and the pinion angle command value θp*.

As for Normative Model Computation Process

In the foregoing embodiments, the steering angle command value θh* is calculated based on the equation (c1) or the like, while using the axial force Taf as an input, but the logic (model) for calculating the steering angle command value θh* is not limited thereto.

As for Control Unit for Steering-Side Electric Motor 36

The control unit for the steering-side electric motor 36 does not necessarily include the drag calculation process M42. For example, the control unit for the steering-side electric motor 36 may input the steering operation amount Ts* to the operation signal generation process M44.

The feedback control itself of the steering torque Th is not indispensable. An assist torque may be calculated based on the steering torque Th, a value obtained by correcting the assist torque in various manners may be adopted as the steering operation amount Ts*, and the steering operation amount Ts* may be input to the operation signal generation process M44.

As for Convertible Angle

In the foregoing embodiments, the pinion angle θp is used as the convertible angle of the rotational angle of the turning-side electric motor 52, but the disclosure is not limited thereto. For example, the convertible angle may be the turning angle of the turning wheels 42.

In the foregoing embodiments, the steering angle θh is used as the convertible angle for the rotational angle of the steering-side electric motor 36, but the disclosure is not limited thereto. For example, the convertible angle may be the rotational angle itself of the steering-side electric motor 36.

As for Steering Operation Amount

In the foregoing embodiments, the steering operation amount Ts* is converted into the torque of the input shaft 32, but the disclosure is not limited thereto. For example, the steering operation amount Ts* may be the torque of the steering-side electric motor 36. In this case, however, the sum of the steering operation amount Ts* and a value obtained by dividing the steering torque Th by the deceleration ratio is adopted as the axial force Taf, or the sum of the steering torque Th and a value obtained by multiplying the steering operation amount Ts* by the deceleration ratio is adopted as the axial force Taf.

As for Turning Operation Amount

In the foregoing embodiments, the turning operation amount Tt* is converted into the torque of the pinion shaft 26, but the disclosure is not limited thereto. For example, the turning operation amount Tt* may be the torque of the turning-side electric motor 52.

As for Target Torque Calculation Process

The base target torque calculation process is not limited to the process for calculating the base target torque Thb* in accordance with the axial force Taf and the vehicle speed V. For example, the base target torque calculation process may be a process for calculating the base target torque Thb* based on only the axial force Taf.

The correction itself of the base target torque Thb* by the hysteresis correction amount Thys is not indispensable.

As for Control Apparatus

The control apparatus does not necessarily need to include the CPU 62 and the ROM 64 to perform software processing. For example, the control apparatus may include a dedicated hardware circuit (e.g., an ASIC or the like) that subjects at least part of the values subjected to software processing in the foregoing embodiments to hardware processing. That is, the control apparatus may be configured according to any one of (a) to (c) mentioned below. (a) The control apparatus includes a processing device that performs all the foregoing processes in accordance with a program, and a program storage device for storing the program, such as a ROM. (b) The control apparatus includes a processing device that performs one or some of the foregoing processes in accordance with a program, a program storage device, and a dedicated hardware circuit that performs the other processes or process. (c) The control apparatus includes a dedicated hardware circuit that performs all the foregoing processes. It should be noted herein that the control apparatus may include a plurality of software processing circuits including processing devices and program storage devices, and/or a plurality of hardware circuits. That is, the foregoing processes may be performed by a processing circuit that includes at least one of i) one or a plurality of software processing circuits and ii) one or a plurality of dedicated hardware circuits.

As for Electric Motors and Drive Circuit

Each of the electric motors may not be an SPMSM, and may be an IPMSM or the like. Besides, each of the electric motors may not be a synchronous motor, and may be an induction motor. Furthermore, each of the electric motors may be, for example, a brushed direct-current electric motor. In this case, an H-bridge circuit may be adopted as the drive circuit.

As for Turning Actuator

The turning actuator is not limited to that exemplified in the foregoing embodiments. For example, the turning actuator may be a so-called dual pinion-type actuator that includes a second pinion shaft for transmitting the power of the turning-side electric motor 52 to the rack shaft 28, in addition to the pinion shaft 26. Besides, for example, the turning actuator may be configured such that the output shaft 52a of the turning-side electric motor 52 is mechanically coupled to the pinion shaft 26. In this case, the turning actuator shares the input shaft 32 and the pinion shaft 26 with the steering mechanism.

As for Steering System

In FIG. 1, the clutch 24 may be removed, and the input shaft 32 may be mechanically coupled to the pinion shaft 26 via a gear ratio variable mechanism that makes the gear ratio variable, instead of using the clutch 24. In this case as well, processes similar to those exemplified in the case of the steer-by-wire system can be realized.

However, the steering system is not limited to this type, and may be configured, for example, such that the input shaft 32 and the pinion shaft 26 rotate integrally with each other. In this case as well, for example, when there is a situation where the turning wheels 42 are unlikely to be turned due to the viscosity of the steering system 10, it is possible to restrain occurrence of the situation, by changing the relationship between the input and the output of the control unit configured to control the torque of the turning-side electric motor 52 in accordance with the viscosity.

What is claimed is:

1. A control apparatus for a steering system, the steering system being configured to turn turning wheels of a vehicle and including an electric motor, the control apparatus being configured to control the steering system, and the control apparatus comprising:
control circuitry configured to perform:
an angle control process for controlling, to an angle command value, a convertible angle that is convertible into a rotational angle of the electric motor,
a predetermined component calculation process for calculating a predetermined component containing at least one of two components that are a viscosity component and a friction component of the steering system, while using a value of a variable regarding a control quantity of the electric motor as an input to the predetermined component calculation process, the predetermined component calculation process including a viscosity component calculation process for calculating the viscosity component as the predetermined component, the viscosity component calculation process including:
a disturbance torque calculation process for calculating, as a disturbance torque, a torque component influencing the convertible angle other than a torque of the electric motor, while using a value of a variable regarding the torque of the electric motor, a detection value of the convertible angle, and the angle command value as values of variables regarding the control quantity, and
a filtering process for allowing selective transmission of a specific frequency component of the disturbance torque having a center frequency of 7 to 9 Hz, while using the disturbance torque as an input to the viscosity component calculation process, the viscosity component calculation process using an output of the filtering process as the viscosity component, and
a relationship change process for changing a relationship of an output from a control unit for the steering system to an input to the control unit, based on the predetermined component calculated through the predetermined component calculation process, the relationship change process including a process for changing the relationship of the output from the control unit for the steering system to the input to the control unit, based on the viscosity component calculated through the viscosity component calculation process.

2. The control apparatus for the steering system according to claim 1, wherein the filtering process includes an intensity change process for changing an intensity of the output in accordance with a temperature of the steering system, even when the input to the filtering process remains unchanged.

3. The control apparatus for the steering system according to claim 1, wherein the convertible angle is convertible into a turning angle of the turning wheels.

4. The control apparatus for the steering system according to claim 3, wherein the control unit is configured to control the convertible angle to the angle command value.

5. The control apparatus for the steering system according to claim 4, wherein the steering system includes a steering wheel that is displaceable without transmitting power to the turning wheels.

6. The control apparatus for the steering system according to claim 3, wherein:
the steering system includes a steering wheel that is displaceable without transmitting power to the turning wheels;
the electric motor is a turning-side electric motor;
the steering system includes a steering-side electric motor configured to apply a torque against displacement of the steering wheel; and
the control unit is configured to control the torque of the steering-side electric motor.

7. The control apparatus for the steering system according to claim 1, wherein:
the steering system includes a steering wheel that is displaceable without transmitting power to the turning wheels; and
the electric motor is a steering-side electric motor configured to apply a torque against displacement of the steering wheel.

8. The control apparatus for the steering system according to claim 7, wherein the control unit is configured to control the torque of the steering-side electric motor.

9. The control apparatus for the steering system according to claim 7, wherein:
the electric motor is a turning-side electric motor configured to turn the turning wheels; and
the control unit is configured to control a torque of the turning-side electric motor.

* * * * *